Sept. 4, 1945. R. M. JACOBSON 2,384,033
CONVEYER MECHANISM
Filed July 5, 1941
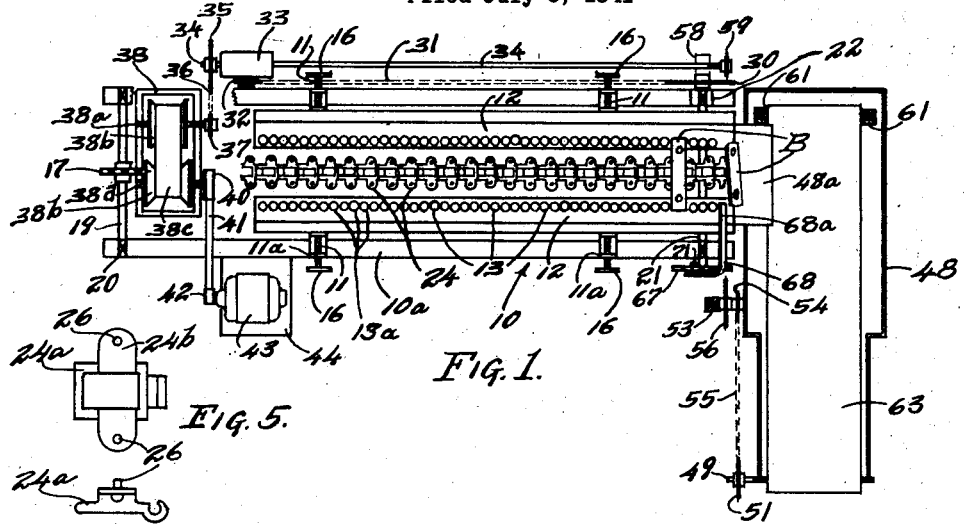
Fig. 1.
Fig. 5.
Fig. 6.
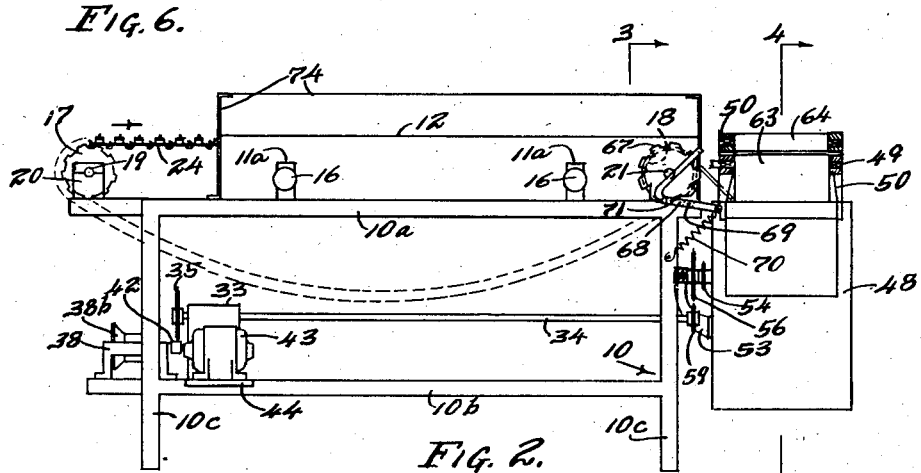
Fig. 2.
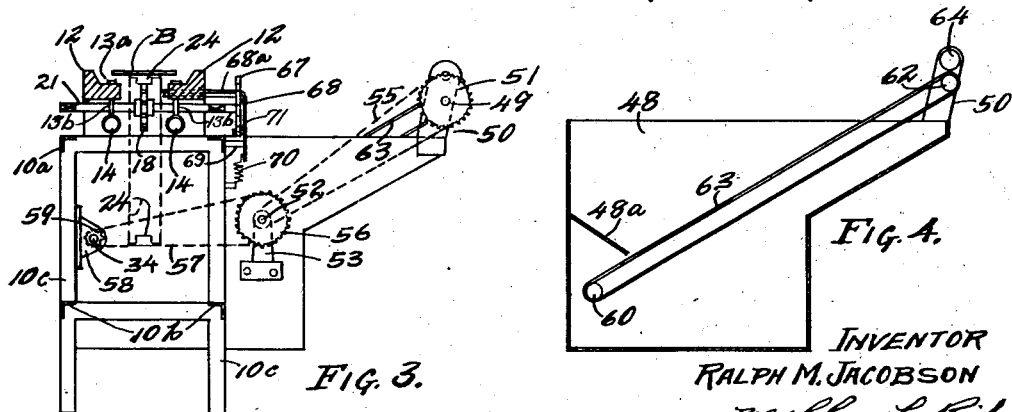
Fig. 3.
Fig. 4.
INVENTOR
RALPH M. JACOBSON
BY Chas. C. Reif
ATTORNEY.

Patented Sept. 4, 1945

2,384,033

UNITED STATES PATENT OFFICE 2,384,033

CONVEYER MECHANISM

Ralph M. Jacobson, Minneapolis, Minn.

Application July 5, 1941, Serial No. 401,147

2 Claims. (Cl. 198—185)

This invention relates to a machine for treating plates or blades. While the invention has various applications and could be used to treat various kinds of plates, blades, or other objects, in the embodiment of the invention illustrated, it is designed for treating or hardening the blades used in grinding or pulverizing mills. These blades are plate-like and of general rectangular form, and it is desired to harden the ends thereof which are the operative portions.

It is an object of the invention to provide a simple, accurate and efficient machine for treating or hardening said blades.

It is a further object of the invention to provide a machine having one or more rows of burners together with means for carrying the plates or blades past said burners to heat the same together with a tank of suitable liquid into which the heated plates or blades are discharged.

It is another object of the invention to provide a machine such as set forth in the preceding paragraph together with means for giving the blades a quick discharge movement or impulse into the tank of liquid.

It is more specifically an object of the invention to provide a plate or blade hardening machine comprising spaced rows of burners, an endless conveyer having a run passing between said rows, means for varying the speed of travel of said conveyer to regulate the heating of said blades, said conveyer preferably having a long slack portion below the burners to enable the same to cool before again passing between said rows of burners.

These and other objects and advantages of the invention will be fully set forth in the following description made in connection with the accompanying drawing in which like reference characters refer to similar parts throughout the several views and in which—

Fig. 1 is a plan view of the machine shown somewhat diagrammatically;

Fig. 2 is a view in side elevation of the machine;

Fig. 3 is a vertical section taken substantially on line 3—3 of Fig. 2 as indicated by the arrows;

Fig. 4 is a vertical section taken substantially on line 4—4 of Fig. 2 as indicated by the arrows, some parts being omitted;

Fig. 5 is a top plan view of a link of the conveyer used; and

Fig. 6 is a view in side elevation of said link, Figs. 5 and 6 being shown on an enlarged scale.

Referring to the drawing, a machine is shown having a frame 10. While this could be of various forms, in the embodiment of the invention illustrated it comprises spaced top horizontal members 10a, lower horizontal spaced members 10b vertically aligned with members 10a, supporting posts or legs 10c arranged at the corner of a rectangle in plan, as well as cross members 10d. Members 10a and 10b are shown as of angular form.

Members 11 are secured to the members 10a and have supported thereon spaced bars 12, which bars have mounted therein a plurality of rectilinearly arranged burners 13. Burners 13 are thus arranged in rows parallel to the edges of members 12. Burners 13 have cylindrical perforated top portions 13a (the perforations not being shown) and comprise tubes 13b which extend downwardly to pipes 14 which supply the burners with gas or a combustible mixture. The bars 12 have connected thereto screws 15 provided with operating hand wheels 16 at their outer ends. Screws 15 are threaded into upstanding flanges 11a on the members 11. These flanges form nuts so that the members 12 can thus be moved with burners 13 to be closer together or farther apart by rotation of screws 15. The connections for supplying gas to the pipes 14 will be suitably constructed to permit said movement. Mounted between members 10a and adjacent the ends of members 12 are sprockets 17 and 18. Sprocket 17 is mounted on a shaft 19 journaled in bearings indicated at 20 carried on members 10a. Sprocket 18 is carried on a shaft 21 journaled in similar bearings 22 also carried on members 10a. An endless conveyer 24 formed of connected links 24a is provided and arranged to travel over the sprockets 17 and 18. The links 24a have flat lugs 24b projecting at either side carrying upstanding pins 26. The pins 26 are so spaced on adjacent links that one of the blades B to be treated fits between said pins as shown in Fig. 1. The blades B will thus be carried along by the top run of conveyer 24 disposed at right angles to the path of movement of said conveyer. The shaft 21 has secured thereto a sprocket 30 over which runs a chain 31 also running over a sprocket 32 secured to a shaft carrier in a speed reducing device 33. Said speed reducing device is of commercial form and need not be further described. It may be stated that it comprises a worm wheel gear secured to the same shaft as sprocket 32 which meshes with a worm gear secured to a shaft 34. Another sprocket 35 is secured to shaft 34 over which runs a chain 36 also running over a sprocket 37. Sprocket 37 is secured to a shaft 38a forming part of a speed-changing device 38. Said speed-changing device is of well known commercial form and specifically forms no part of the present invention. It may be stated that it comprises cone pulleys 38b having their smaller ends facing each other and secured on shafts 38a and 38d respectively. A belt 38c runs over these pulleys. Means are provided for moving the pulleys toward or from each other to vary the effective diameter thereof and thus vary the speed of belt 38c. Shaft 38d has secured thereto a pulley 40 over which runs a belt 41 also running over a pulley 42 secured to the armature shaft of a motor 43. Motor 43 is secured to a bracket 44 projecting outwardly from and supported on one of the members 10b. With the described connections it will be seen that motor 43 will transmit power to the speed-changing device 38. Shaft 38a can thus be driven at different speeds and this will through chain 36 and sprockets 37 and 35, drive shaft 34. Sprocket 32 will be driven at a fixed reduction in speed and this will, through chain 31 drive sprocket 30. Sprocket 30 will drive shaft 21 so that conveyer 24 will be driven and its upper run will move in the direction of the arrow in Fig. 2. Some cooling means for the blades is provided and while this could take various forms, in the embodiment of the invention illustrated, a tank 48 is provided at one end of the frame 10 and this will contain a suitable liquid into which the blades B are discharged from conveyer 24. A shaft 49 is journaled in brackets 50 supported at one end of tank 48 and a sprocket 51 is secured to shaft 49. A shaft 52 is journaled in a bracket 53 secured to one side of tank 48 and has secured thereto a sprocket 54. A chain 55 runs over sprockets 51 and 54. Shaft 52 also has secured thereto a sprocket 56 and this is driven by a chain 57 running over a sprocket 59 secured to shaft 34. Shaft 34 as already stated, extends through the speed reducing device 33 and is further journaled in a bracket 58 secured to one of the posts 10c. A roller 60 is revolubly mounted adjacent the bottom of tank 48 and has trunnions journaled in bearings indicated as 61 in Fig. 1. Another roller 62 is carried on shaft 49 and a conveyer belt 63 travels over the rollers 60 and 62. Another roller 64 is revolubly mounted above roller 62 and in position substantially engaging conveyer belt 63. Roller 64 is preferably of yielding material.

Shaft 21 has secured to one end thereof a ratchet wheel 67. An arm 68 has a substantially V-shaped portion as seen in Fig. 2 and is pivotally mounted on a pivot stud 69 carried in one of the members 10a. Arm 68 has a portion 68a extending substantially horizontally to a point adjacent conveyer 24 at the rear side of sprocket 18, the end of this portion being disposed in position to engage one of the blades B as it is about to be discharged from conveyer 24. A tensile coiled spring 70 has one end secured to the lower end of arm 68 and has its other end secured to one of the posts 10c. Arm 68 carries a pin 71 which engages the periphery of ratchet wheel 67 and said pin is held against said periphery by spring 70.

A hood 74 is supported on members 10a as indicated in Fig. 2 and encloses the members 12 and burners 13 as well as most of the upper run of conveyer 24. Said hood will be provided with a suitable stack (not shown) for carrying off the products of combustion from burners 13.

In operation the blades B to be treated will be placed on conveyer 24 as it leaves sprocket 17. As stated, these blades fit nicely between the pins 25 on the adjacent links 24a of said conveyer. Motor 43 will be driven and the speed-changing device 38 will be regulated to give the desired speed to the conveyer 24. The burners 13 will be lighted and the conveyer will carry said blades B past burners 13 so that their ends pass closely adjacent said burners. The ends of the blades will thus be brought to the desired temperature. The pin 71 as stated, is held against the periphery of ratchet wheel 67. The teeth of this wheel act as cams and as said wheel rotates pin 71 moves over the outer edge of each tooth and then snaps suddenly into the space between the teeth due to spring 70. Just before the pin 71 drops into said space the arm portion 68a is in position to engage the blade B which is just about to drop from conveyer 24. The pin 71 snaps into the space between the teeth and arm portion 68a is given a quick movement toward blade B and said blade is given a quick discharge movement from the conveyer into the liquid in tank 48. The blades are thus quickly discharged as they reach the end of the conveyer so that they will not lag in the discharge movement and cool to an undesirable extent. The blades B are thus successively carried past the burners 13 and the conveyer 24 travels over the sprockets 17 and 18. The conveyer 24 is provided with a long slack portion below and between sprockets 17 and 18. This long slack portion is provided so that the conveyer will have ample oportunity to cool before again passing between the burners 13. It will be noted that said portion is outside the hood 74. The blades dropped into the tank 48 drop onto the belt 63 being guided thereon by the deflector 48a and said blades are carried upwardly and discharged. Roller 64 acts to dry the blades as they pass beneath it. As stated, the members 12 can be moved toward and from each other and this will vary the position of the burners 13. The burners can thus be accurately positioned relative to conveyer 24 and to the blades B to be treated so that the desired portions of said blades will be heated.

From the above description it will be seen that I have provided a very compact and efficient machine which very accurately treats the blades to give the desired degree of hardness. The heating can, as stated, be regulated by changing the speed of conveyer 24 and by properly positioning the members 12. Some regulation can of course, be had by regulating the gas flame. The machine is simple in construction and does its work in an accurate and efficeint manner. The same has been amply demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A conveyer device for use in heat treating of articles having in combination, a conveyer, means on said conveyer for supporting and progressing plates for heat treatment, said conveyer having a discharge end, a pivoted arm having one end disposed adjacent said end of said conveyer and in position to engage a plate about to be discharged from said conveyer, a rotating toothed ratchet wheel, said arm carrying means engaging the periphery of said wheel, and resilient means holding said last mentioned means against said periphery whereby said arm is moved by said wheel to place said resilient means under tension so that said second mentioned means will snap into the spaces between the teeth of said ratchet wheel to cause said end of said arm to move in the general direction of the movement of said conveyer and plates to give a qiuck discharge impulse to said plate in said direction to discharge the same from said conveyer.

2. A conveyer device for use in heat treating articles having in combination, a conveyer, means on said conveyer for supporting plates to progress them for heat treatment, said conveyer having a discharge end, a swinging arm adjacent said end disposed so as to engage each of said plates as it reaches said end, a resilient means connected to said arm tending to move it in one direction and a rotatable cam means for moving said arm in the opposite direction and releasing the same to give said arm a quick movement in the general direction of the movement of said conveyer and plates to engage a plate on said conveyer and give the same a quick discharge impulse to project it from said conveyer in said direction.

RALPH M. JACOBSON.